(12) United States Patent
Ueno et al.

(10) Patent No.: US 6,487,886 B2
(45) Date of Patent: Dec. 3, 2002

(54) IRREGULAR-SECTION TUBULAR BODY AND AXLE BEAM FOR TORSION BEAM AND METHOD OF MANUFACTURING THE SAME

(75) Inventors: Yukikazu Ueno, Toyota (JP); Setsuko Shimada, Toyota (JP); Tetsuji Sano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/788,489

(22) Filed: Feb. 21, 2001

(65) Prior Publication Data

US 2001/0022099 A1 Sep. 20, 2001

(30) Foreign Application Priority Data

Mar. 9, 2000 (JP) ......................................... 2000-064839
Dec. 11, 2000 (JP) ......................................... 2000-375948

(51) Int. Cl.$^7$ .......................... B21D 26/02; B21D 53/90; B60G 21/05
(52) U.S. Cl. ............................ 72/57; 72/58; 301/124.1; 301/127
(58) Field of Search ............................. 301/124.1, 127; 72/57, 58, 61, 62

(56) References Cited

U.S. PATENT DOCUMENTS

| | | | | |
|---|---|---|---|---|
| 2,007,793 A | * | 7/1935 | Crawford | .................. 301/124.1 |
| 4,787,680 A | | 11/1988 | Bonjean et al. | |
| 5,520,407 A | * | 5/1996 | Alatalo et al. | ............ 301/124.1 |

FOREIGN PATENT DOCUMENTS

| | | |
|---|---|---|
| EP | 0 650 860 B1 | 5/1995 |
| JP | 8-90097 | 4/1996 |

\* cited by examiner

*Primary Examiner*—David B. Jones
(74) *Attorney, Agent, or Firm*—Oliff & Berridge, PLC

(57) ABSTRACT

The invention provides a method of manufacturing an irregular section tubular body and axle beam. The axle beam has a tubular worked body that has sealed liquid therein and is press-formed by upper and lower press molds. One of the press molds has a convex mold portion to form a concave portion concaved in an axis perpendicular direction at an axial part of the axle beam. The press-forming of the tubular worked body is completed by a one stroke process using liquid pressure that increases as the internal volume of the worked body decreases due to formation of the concave portion. The concave portion extends substantially the length of the axle beam and has a substantially U-shaped or V-shaped cross-section forming a closed and sealed space.

5 Claims, 13 Drawing Sheets

FIG. 18
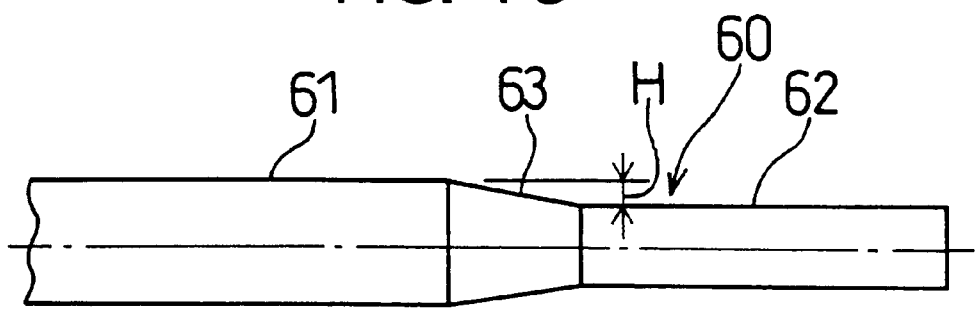
19 FIG.
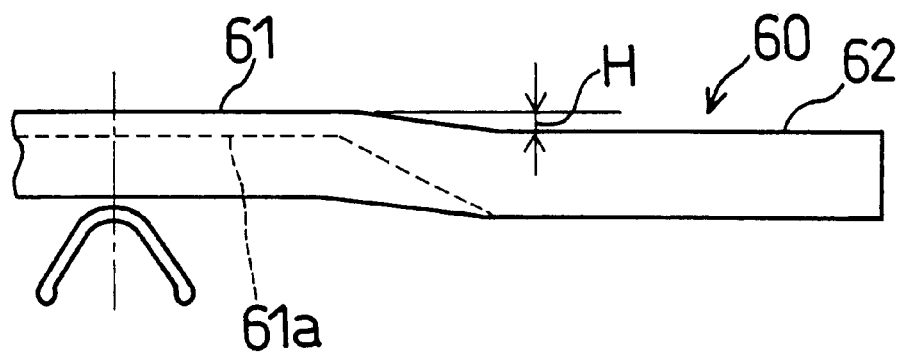

IRREGULAR-SECTION TUBULAR BODY AND AXLE BEAM FOR TORSION BEAM AND METHOD OF MANUFACTURING THE SAME

BACKGROUND OF THE INVENTION

1. Field of Invention

This invention relates to an irregular-section tubular body and an axle beam for a torsion beam and a method of manufacturing the same. In particular, the manufacturing method of the present invention manufactures the irregular-section tubular body having a concave portion by press-forming a tubular worked body by applying liquid pressure to an inner surface thereof. The axle beam for a torsion beam of the present invention is joined, if the torsion beam is used in a rear-wheel suspension device of a vehicle, to a pair of trailing arms to attach wheel sides integrally to the axle beam.

2. Description of Related Art

A manufacturing method for an irregular-section tubular body having a concave portion, concaved in a direction perpendicular to axis thereof (hereinafter simply referred "axis perpendicular direction"), at least part of the concave portion being in an axial direction is known. One such manufacturing method includes press-forming a tubular worked body by applying pressure to a liquid sealed in an internal space of a tubular body to an inner surface thereof.

For example, Japanese Patent Laid-open (Koukai) No. 8-90097 discloses a manufacturing method for manufacturing an irregular-section tube having a shape of which varies in a longitudinal direction by usage of liquid pressure. In this manufacturing method, an internal space of a circular tube as the worked body is filled with liquid. Further liquid is then supplied by a pump to apply predetermined pressure P1 to an inner surface of the circular tube. In this condition, the circular tube is press-formed by a pair of upper and lower press molds of predetermined shape and subjected to bending work. Finally, further liquid is supplied into the circular tube to increase the liquid pressure to a predetermined value P2 so that the circular tube bulges or expands along mold surfaces of the upper and lower press molds. Thus, the circular tube is formed into the final irregular-section shape to complete the formation.

Using the above irregular-section tubular body, an axle beam formed and used for a torsion beam as a rear-wheel suspension device of a vehicle is also known.

For example, EP 0650860 B1 discloses, as shown in the attached FIG. 20, a torsion beam comprised of a pair of trailing arms 91 attached to wheel sides, and an axle beam 92 each end of which is joined to each of trailing arms 91, respectively, to connect them integrally to the axle beam. The axle beam 92 is formed into a shape to have a large bending rigidity and small twisting (torsion) rigidity. As shown in the attached FIG. 21, the axle beam 92 has cross-section in the axis perpendicular direction of closed section shape including a closed space therein. The cross-section has a star shape in which three wing portions 92a extend radially outwardly and equidistantly in a circumferential direction.

However, the conventional manufacturing method of the irregular-section tube body requires both the press-forming process which bends the circular tube by the press molds, and the liquid pressurizing process, which pressurizes liquid in the circular tube by the liquid pressurizing device to obtain the final irregular-section shape of the tubular body. For these reasons, conventional manufacturing methods have been suffering from the disadvantages of the manufacturing process being complex and troublesome.

In addition, since the circular tube is bulged only by the liquid pressure to follow to the mold surfaces, very large liquid pressure is needed for the bulging. For this reason, the liquid pressurizing device used to positively pressurize the liquid, and a large-size extra hydraulic pressing device used to apply a mold fastening force to the press molds against the increasing liquid pressure are necessary. As a result, not only does the equipment become complex and large-sized, but equipment cost increases.

In the above conventional axle beam 92, as shown in FIG. 21, three wing portion 92a of the same size and same shape and extending radially outwardly and equidistantly in the circumferential direction are disposed. As a result, it has a cross-section shape in which a centroid and a shearing center coincide. Such coincidence decreases the roll rigidity in the axle beam 92 and creates an over-steer tendency, whereby the steer stabilizing is decreased.

SUMMARY OF THE INVENTION

The present invention has been made in view of the above circumstances and provides a manufacturing method for an irregular-section tubular body which simplifies the manufacturing process and excludes the additional liquid pressurizing device and the extra hydraulic pressing device, thereby avoiding the complex and large-sized equipment and an increase equipment cost are avoided. Also, the present invention provides an axle beam for the torsion beam which provides an increase in the steer stabilizing character by an improvement of the section-shape in the axis perpendicular direction thereof. Further, the present invention provides upper and lower press molds for press-forming a tubular worked body to the axle beam for the torsion beam.

In a first embodiment of the manufacturing method for the irregular-section tubular body comprises a tubular worked body, with a sealed liquid therein, is press-formed by an upper press mold and a lower press mold at least one of which has at least one convex mold portion to form a concave portion concaved in an axis perpendicular (radial) direction at an axial part of the worked body by the convex mold portion; and the press-forming of the worked body to the final tubular body is completed by a one stroke process from a press start point to a press complete point by using a liquid pressure increasing as a decrease of the internal volume of the worked body occurs due to formation of the concave portion, without pressurizing the liquid in the worked body by a pressurizing device.

In the suitable mode, the one stroke process includes a pressure increase process in the former half of the stroke from the press start point to a predetermined point, the pressure increase process press-forming the worked body with the liquid pressure gradually increasing as a decrease of the internal volume of the worked body, due to formation of the concave portion to an inner peripheral surface of the worked body; and a non-pressure increase process in the latter half of stroke from the predetermined point to the press complete point, the non-pressure increase process, following the pressure increase process, press-forming the worked body without applying the increasing liquid pressure to the inner peripheral surface of the worked body.

Here, the press-forming performed without applying the increasing liquid pressure on the inner peripheral surface of the worked body includes a press-forming performed (i)

with applying a liquid pressure maintained in a constant pressure on the inner peripheral surface of the worked body, (ii) with applying a gradually decreasing liquid pressure on the inner peripheral surface of the worked body, and (iii) with applying a gradually decreasing liquid pressure on the inner peripheral surface of the worked body from the start to midway through a non-pressure increase process, and without applying liquid pressure on the inner peripheral surface in a final stage of the non-pressure increase.

In the suitable mode, the mold surface of the upper press mold and a mold surface of the lower press mold do not restrain a circumferential part of an outer peripheral surface of the worked body to leave a non-restrain surface at a portion where the concave portion is being formed. Also, in the non-pressure increase process, the liquid pressure applied to the inner peripheral surface of the worked body is maintained at a constant pressure or is decreased, by a liquid-discharge controlling device discharging liquid from the worked body at the predetermined point. Further, in the pressure increase process, with the worked body being set above the lower press mold having the convex mold portion, the upper press mold is descended so that the concave portion is formed on the worked body by the convex portion of the lower press mold.

The second manufacturing method for manufacturing an irregular-section tubular body includes a step for sealing fluid in a tubular worked body and for attaching a fluid-discharge controlling device discharging the fluid so that fluid pressure does not go over a predetermined pressure to the worked body; and a press-forming step for press-forming the worked body to apply an acting force thereto, increasing pressure of the fluid near to the predetermined pressure by decreasing a sealed space of the worked body, and then press-forming the worked body with discharging the fluid therein by the fluid-discharge controlling device so that the pressure of the fluid does not reach the predetermined pressure.

In the suitable mode, the fluid-discharge controlling device can be a relief valve or an accumulator operating when the pressure of the fluid reaches near to the predetermined pressure. Also, the liquid-discharge controlling device can be a restricted portion having a predetermined open rate and constantly discharging the fluid.

The axle beam of the present invention has, at least at an axial part, a concave portion concaved in an axis perpendicular direction, an axis perpendicular section at the concave portion having a closed section shape including a closed and sealed space, and a shape a shearing center being offset from a centroid by a predetermined amount.

Here, the axis perpendicular direction shape at the concave portion having a "closed section shape including a closed and sealed space" means an outer peripheral wall of the axis beam does not have circumferential ends to form a ring. In other words, the outer peripheral wall of the axle beam is formed by an annular wall. The outer peripheral wall formed by the annular wall can form single closed and sealed space, or plural closed and sealed spaces separated by an overlap portion where opposing inner surfaces of the outer peripheral wall are overlapped.

In the preferred embodiment, a circumferential part of the worked body opposite the concave portion in the axis perpendicular direction is so shaped that the worked body has a substantially U-shape or V-shape axis perpendicular section at the concave portion.

In the preferred embodiment, a rough tube comprising a large-diameter axially intermediate portion, a pair of small-diameter axially end portions having smaller diameter than the large-diameter axially intermediate portion, and a pair of diameter change portions connecting each end of the large-diameter axially intermediate portion. Each of the small-diameter axially end portions are subjected to a bending work to form each of the trailing arms from each of the small-diameter axially end portions and to form the axle beam by at least the large-diameter axially intermediate portion. Here, the large-diameter axially intermediate portion, the diameter change portions and the small-diameter axially end portions are connected by a continuous surface having no radial step, due to an offset of the small-diameter axially end portions from the large-diameter axially intermediate portion in the same direction of the shearing center being offset from the centroid, at a circumferential part of the small-diameter axially end portions at the offset side.

In the preferred embodiment, each of the small-diameter axially end portions are bent in a direction orthogonal to the axial direction of the axle beam and orthogonal to a concave direction of the concave portion.

An upper press mold and a lower press mold for press-forming an axle beam for torsion beam by press-forming a tubular worked body with sealed liquid therein, includes one of the upper press mold and the lower press mold has at least one convex mold portion to form at least one concave portion concaved in an axis perpendicular direction at an axial part of the worked body and an axial length shorter than that length of the worked body. The other of the press molds has a concave mold surface having an axial length substantially equal to the length of the worked body.

In the suitable mode, the upper press mold or the lower press mold having the convex mold portion has width smaller than dimension of the worked body in the axis perpendicular direction.

The first manufacturing method for the present invention completes formation of the final irregular-section tubular body by only press-forming the worked body having sealed liquid therein, not requiring the liquid pressurizing process after the press-forming. As a result, the manufacturing process for the irregular-section tubular body becomes simple. Also, the liquid pressurizing device or the large-size extra hydraulic pressing device are not needed, thus avoiding complex and large-sized equipment and avoiding increase of the equipment cost.

In the manufacturing method of the present invention, none of a rise in the speed of the liquid pressure (pressure increase speed) in the worked body, a maintained time period of the max. pressure, nor the pressurized state of the liquid after the liquid pressure reaches max. pressure, affect the quality of the press-formed article.

During the pressure increase process in the former half of the stroke, the worked body is press-formed with the liquid pressure increasing as the internal volume of the worked body due decreases due to formation of the concave portion, being applied on the inner peripheral surface. By press-forming the tubular worked body filled with the liquid by the upper press mold and the lower press mold, a portion, or part of, the worked body pressed by the convex mold portion of the press mold plastically deforms to be concaved in the axis perpendicular direction.

During formation of the concave portion, the internal volume of the worked body decreases. The worked body is press-formed with the liquid gradually increasing as the internal space of the worked body decreases due to the forces being applied to the inner peripheral surface thereof.

For this reason, in the pressure increase process, not only the worked body can be deformed or shaped to follow the mold surfaces of the press molds, but the worked body can be prevented from buckling. Thus, the worked body is smoothly formed.

In the non-pressure increase process in the latter half of the stroke, the worked body is press-formed without the liquid pressure increasing stage being applied to the inner peripheral surface thereof. That is, in the non-pressure increase process, the worked body is press-formed (i) with the liquid pressure being applied to the inner peripheral surface maintained at a constant level, (ii) with the liquid pressure being applied to the inner peripheral surface thereof gradually decreasing, or (iii) with the liquid pressure being applied to the inner peripheral surface thereof from start to midway of non-pressure increase process gradually decreasing, and without the liquid pressure being applied to the inner peripheral surface thereof in a final stage. By press-forming the worked body without applying the liquid pressure under the increasing stage to the inner peripheral surface thereof, the liquid pressure in the worked body is prevented from excessively increasing.

A one stroke process of the press-forming from the press start point to the press complete point can also be comprised of only a pressure-increase process. The process applies liquid pressure gradually increasing as decrease of the internal volume of the worked body due to formation of the concave portion to the inner peripheral surface thereof.

As the concave portion is formed at the axial part of the worked body, a single concave portion, two or more axially separated concave portions, or a long concave portion axially extending over the worked body, can be adopted. Plural concave portions separated in the axial direction can be disposed at the same position or at the different (separate) positions in the circumferential direction of the worked body. Also, plural concave portions disposed at one axis perpendicular section of the worked body can be separated in the circumferential direction. There is no limit or restriction in the shape and size of the concave portion. When plural concave portions are provided, they can have different shapes and sizes.

The convex mold portion is provided on at least one of the upper press mold and the lower press mold. Shape, size, number and location of the convex mold portion can be selectively determined to correspond to that of the concave portion of the irregular-section tubular body to be formed. The mold surfaces of the upper press mold and the lower press mold, other than the convex mold portion, can also be selectively determined to correspond to an outer surface shape of the irregular-section tubular body to be formed.

The worked body can be press-formed by restraining the whole outer peripheral surface at the portion where the concave portion is formed, by the mold surfaces of the upper press mold and the lower press mold. However, press-forming the worked body without restraining the circumferential part(s) of the above portion by the press molds is preferable. In this case, the circumferential part(s) of the portion forms the restrained surface(s) which is not restrained by the mold surfaces of the upper and lower molds.

By constructing the upper and lower molds in this way, the convex mold portion can be a convex partial mold having a width shorter than an axis perpendicular width of the worked body (diameter when the worked body is tubular). This reduces mold cost and a mold wear compared to the upper and lower press molds of sealed and closed type.

Even when the worked body is press-formed without restraining the surface(s), excessive deformation of the worked body at the non-restrained surface can be prevented by controlling the max. pressure of the liquid in the worked body. The max. pressure the liquid may reach during the press stroke, including the press complete point, can be set to be smaller than the predetermined value by, for example, removing an increase of the liquid pressure in the predetermined point of the press stroke.

Also, in the first and second manufacturing methods, the liquid pressure applied to the inner surface of the worked body, in the non-pressure increase process, is preferably maintained at a predetermined pressure or decreased by using a fluid-discharge or liquid-discharge controlling device that discharges the fluid or liquid from the worked body at the predetermined point. With such a liquid-discharge controlling device, the liquid pressure applied to the inner surface of the worked body can be easily and accurately controlled, so that any increase of the liquid pressure at the predetermined point can be easily and securely removed.

The liquid-discharge controlling device is, for example, comprised of a discharge tube and a relief value. The discharge tube is connected to a seal plug sealingly closing the end portion of the worked body and communicating with the internal space of the worked body. The relief valve is provided on the discharge valve and automatically opens when the liquid pressure in the worked body goes over the set pressure and automatically closes when it goes below the set pressure.

Another type of liquid-discharge controlling device can be comprised of an accumulator including a cylinder member, a connect tube and a gas supply means. The cylinder member has a closed operating chamber of a predetermined capacity in which a partition member is disposed reciprocately. The partition member liquid-sealingly partitions the closed chamber into a liquid chamber and a gas chamber. The connect tube is connected at one end thereof to a water-discharge hole of a second seal plug and is connected at other end thereof to the liquid chamber of the cylinder member, to connect the internal space of the worked body and the liquid chamber of the cylinder member. The gas supply means is connected to the gas chamber of the cylinder member to supply gas of a predetermined pressure thereto.

Still another type of the liquid-discharge controlling device can be comprised of a discharge tube and a restrict portion. The discharge tube is connected to a seal plug sealingly closing the end portion of the worked body and communicating with the internal space of the worked body. The restrict portion is provided on the seal plug or the discharge tube and has a section-area of a flow passage so that the liquid pressure in the worked body becomes the max. pressure at the predetermined point in the press stroke.

Here, the above irregular-section tubular body is used to construct the torsion beam by bending both end portions thereof in another step so that at least the large-diameter axially intermediate portion forms the concave portion of the axle beam, while at least the small-diameter axially end portions form the trailing arms.

The axle beam for the torsion beam of the present invention is joined to the paired trailing arms integrally attached to the wheel side. The axle beam can be formed integral with each of the trailing arms joined to each end of the axle beam. Alternatively, the axle beam can be formed independent from each of the trailing arms, and then connected to them by welding, for example.

The axis perpendicular section of the axle beam, at the concave portion has a closed section shape including the closed and sealed space, and has the shape the shearing center being offset from the centroid.

Here, the "centroid" of the axis perpendicular section shape means a center of gravity of a plane figure thereof. The "shear center" of the axis perpendicular section shape means a point in the section where a composed force of shearing forces acts so that the axle beam is subjected to simple bending without generating a twisted deformation, even when the twisting force, for example, resulting from the force applied to the trailing arms, is applied to the section in addition to the bending moment. The concept of "shear center" is well known in the field of material mechanics. The centroid and the shear center can be determined unequivocally based on the axis perpendicular section shape by a predetermined geometrical calculation.

The concave portion of the predetermined shape formed at the axial part of the axle beam, and the offset of the shear center from the centroid, at the concave portion, not only increases the roll rigidity, but diminishes under-steer and increases the tracking character of the vehicle. Thus, steering stability increases.

Due to the cross-section shape of the concave portion, the torsion rigidity and roll rigidity of the axle beam can be adjusted by the changing size or dimension of the closed and sealed space. For this reason, no additional stabilizer for the roll control is required. Also, the axle beam, having the closed cross-section shape including the closed and sealed space, does not have any shear edge portion generating fatigue cracks, so that endurance character has increased.

Regarding the offset amount of the shear center from the centroid in the axis perpendicular section shape, the above advantages resulting from the offset can not be rendered when the offset is too small. Also, the tracking characteristics of the vehicle is affected badly when the offset is too large. For this reason, the offset amount of the shearing center should be determined in range so that both requirements are satisfied. Regarding the offset direction of the shear center from the centroid in the axis perpendicular section shape, the shear center is sufficiently disposed at a position at least to be above the centroid when the axle beam is mounted onto the vehicle. However, for effecting the steering stabilizing character resulting from the offset, the shearing center is preferably disposed at a position to be just above the centroid when the axle beam is mounted onto the vehicle.

Regarding the shape of the axis perpendicular section shape at the concave portion, various shapes can be adopted as long as it has closed section shape having the closed and sealed space and the shearing center is offset from the centroid. The axis perpendicular section shape can be formed into a substantially U-shape, V-shape, Y-shape or laid U-shape. Among them, the U-shape or V-shape is preferable. In such shapes of the axis perpendicular section shape, the size of the closed and sealed space and the offset amount of the shear center can be easily changed. As a result, the twist rigidity, roll rigidity of the axle beam, and steering character can be easily adjusted. In addition, the shear center can be effectively offset from the centroid in a limited space.

In addition, with adjustment of the twist rigidity and roll rigidity of the axle beam, the twist rigidity and roll rigidity become larger as the closed and sealed space becomes larger. For this reason, the size of the closed and sealed space is suitably determined corresponding to the required twist rigidity and roll rigidity. The closed and sealed space can be formed by single closed and sealed space enclosed by an outer peripheral wall of the axle beam, or plural closed and sealed spaces separated by an overlapped portion where opposing inner surfaces of the outer peripheral wall are abutted.

In view of certain restrictions such as setting space in the vehicle, the axle beam for torsion beam, the trailing arms preferably have small size as thin as possible in the range where it has the necessary rigidity. For satisfying such a requirement, an axle beam shown in FIG. 18 can be adopted. For manufacturing the axle beam, a rough tube 60 is prepared. This rough tube 60 is comprised of an large-diameter intermediate portion 61 located at an axially intermediate position of the worked body, small-diameter end portions 62 located at both end positions thereof and having smaller diameter than the large-diameter intermediate portion 61, and outer diameter gradually change portions 63 connecting each end of the large-diameter intermediate portion 61 and each of the small-diameter end portions 62 respectively. All of the large-diameter intermediate portion 61, small-diameter end portions 62 and outer diameter gradually change portions 63 are disposed to be coaxial. By bending the rough tube 60, the torsion beam in which, at the both ends of the axle beam having the concave portion of the predetermined shape, a pair of trailing arms are joined integrally is manufactured.

After forming the concave portion 61a on the large-diameter intermediate portion 61, the rough tube 60 is subjected to the bending work. Thus, each of the small diameter end portions 62 forms each of the trailing arms, and at least the large-diameter intermediate portion 61 and each of the outer diameter change portions 63 form the axle beam.

However, following problems arise. In the rough tube 60 having three portions 61, 62 and 63 all of which are coaxial but each of which has different diameter, each of the outer diameter gradually change portions 63 gradually decreases the outer diameter thereof from one end of the large-diameter intermediate portion 61 to one end of the small diameter end portions 62 equally in the circumferential direction. As a result, a radial step H having equal height in the circumferential direction is formed between the large-diameter intermediate portion 61 and each of the small-diameter end portions 62.

For this reason, as shown in FIG. 19, even after the concave portion 61a has been formed on the large-diameter intermediate portion 61, the radial step H remains at circumferential part between the large-diameter intermediate portion 61 and each of the small-diameter end portions 62. A compression force applied to the axle beam in an axial direction thereof may cause a buckle at a portion of the step H, so that rigidity of the axle beam against the axial input may decrease. If the steps H exist at the both end portions of the axle beam, rigidity of the axle beam against the input from the lateral directions of the vehicle may decrease.

To the contrary, a rough tube in which each of the small-diameter axially end portions is offset from the large-diameter axially intermediate portion in the same direction as the offset direction of the shear center from the centroid can be used. In this rough tube, at a circumferential part at a side of the small-diameter axially end portions are offset, the large-diameter axially intermediate portion, outer diameter gradually change portions and small-diameter end portions are connected by a continuous surface without a radial step. By using such rough tube for manufacturing the axle beam, the continuous surface remains at the circumferential part even after the concave portion has been formed. In this way, the above step H that decreases the rigidity of the axle beam against the input in the axial direction can be removed, whereby rigidity against the input of axial direction can be increased.

BRIEF DESCRIPTION OF THE DRAWINGS

FIG. 18 is a front view showing an coaxial and different diameter rough tube having a large-diameter intermediate portion, small-diameter end portions and outer diameter gradually change portion;

FIG. 19 is a front view showing a step H formed between the large-diameter intermediate portion formed a concave portion thereon and small-diameter end portions;

DETAILED DESCRIPTION OF PREFERRED EMBODIMENTS

Preferred Embodiment of the Invention

Figure 1:
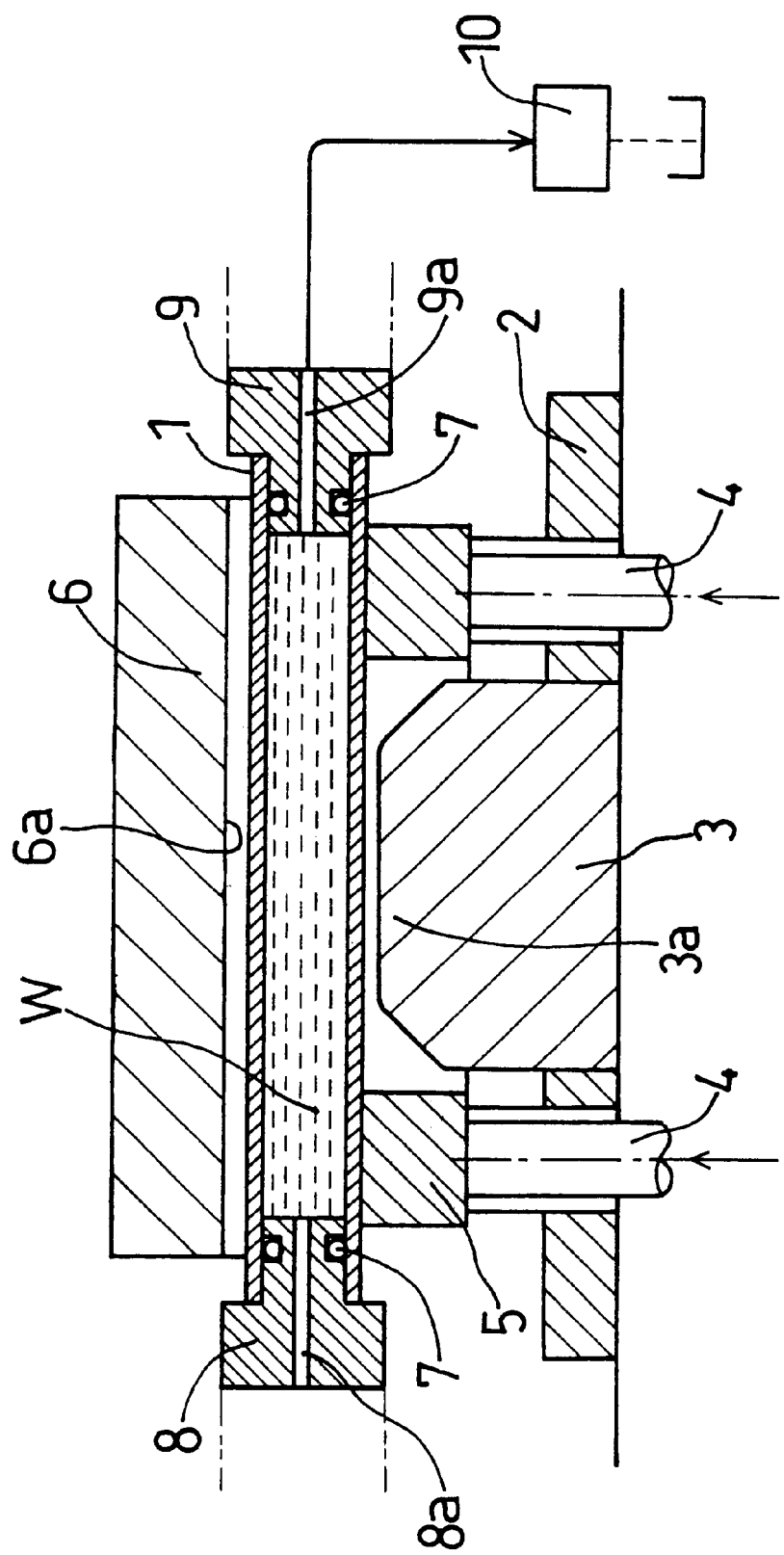
FIG. 1 is a section view showing a state prior to a press-forming according the manufacturing method for irregular section tubular body of an embodiment 1.

Hereinafter, various embodiments of the present invention will be explained with reference to attached drawings.

An embodiment 1 of the present invention is shown in FIGS. 1 to 5. A manufacturing apparatus manufactures, by press-forming a tubular worked body 1 made of metal blank tube having a true circle cross-section shape in direction perpendicular to an axis (hereinafter, simply referred as "axis perpendicular direction") of the irregular-section tubular body having a concave portion 1a concaved in the axis perpendicular direction at a part thereof.

The manufacturing apparatus includes a mold support 2, a lower press mold 3, a floating mold 5, an upper press mold 6, a first seal plug 8, a second seal plug 9 and a liquid-discharge control device 10. The lower press mold 3 is fixed on the mold support 2 at predetermined position thereof. The floating mold 5 is disposed reciprocately in upper-lower direction relative to the mold support 2, and is urged upwardly by a pneumatic cylinder (not shown) via a pair of cushion pins 4. The upper press mold 6 is supported movable in a upper-lower direction by a hydraulic cylinder (not shown). The first seal plug 8 is joined to an open portion at one end of the worked body 1 to liquid-seal it via a seal packing 7. The second seal plug 9 is joined to an open portion at the other end of the worked body 1 to liquid-seal it via a seal packing 7. The liquid-discharge control device 10 is connected to the second seal plug 9.

The lower press mold 3 is a partial mold to form a concave portion 1a on a lower part of the worked body 1 at an axially intermediate portion, and has a convex mold portion 3a corresponding to the convex portion 1a. The lower press mold i.e. convex partial mold 3 has an axial length shorter than that of the worked body 1, and a width d smaller than the diameter (diameter in the axis perpendicular direction) of the worked body 1. The worked body 1, due to above dimensional relation, is not restrained at circumferential areas (non-restrained surfaces) 1b shown by P in FIG. 3 in an axial portion where the concave portion 1a is formed by the upper press mold 3 and the lower press mold 6.

The upper press mold 6 forms an upper part of the worked body 1, and has on a lower side thereof a concave mold surface 6a of which axial length is slightly smaller than that of the worked body 1 and which extends a whole axial length thereof. The axial length of the upper press mold 6 is longer than that of the lower press mold 3, and the lower press mold 3 is disposed at an approximately axially intermediate portion of the upper press mold 6. The concave mold surface 6a of the press mold 6 is concaved into U-shape in an axially intermediate area corresponding to the axial length of the convex mold surface 3a of the lower press mold 3. Axial end areas of the concave mold surface 6a are concaved into a semi-circular shape corresponding to an outer surface shape of the worked body 1 to have same diameter as that of the worked body 1.

The first seal plug 8 is formed at a water supply hole 8a to which a water supply tube (not shown) is connected. Water W is supplied to an internal space of the worked body 1 by a water supply pump (not shown) through the water supply tube and the water supply hole 8a. Oil may be supplied into the worked body 1 instead of the water.

Figure 4:
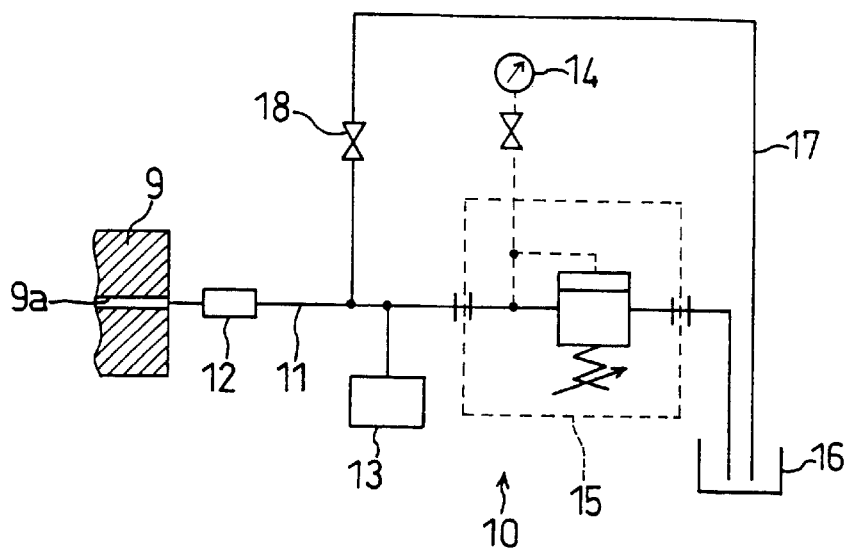
FIG. 4 is a block view showing a circuit construction of a discharge control device in the manufacturing method for the embodiment 1.
Figure 5:
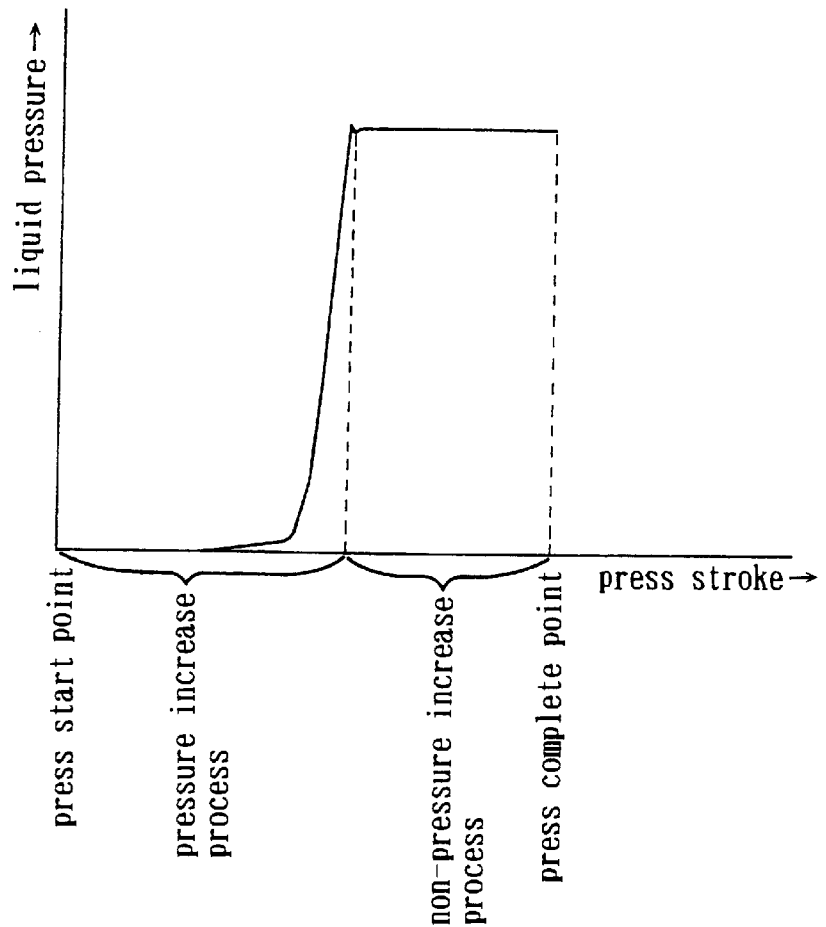
FIG. 5 is a diagram showing relation between a press stroke and a liquid pressure in a worked body in the manufacturing method of the embodiment 1.

The second seal plug 9 is formed at a water-discharge hole 9a to which a liquid-discharge control device 10 is connected. The liquid-discharge control device 10 is comprised of, as shown in FIG. 4, a water-discharge tube 11, a high pressure coupler 12, a digital pressure meter 13, a variable relief valve 15, a drain tank 16, a drain tube 17, and an air relief valve 18. The water-discharge tube 11 is connected at one end thereof to the water-discharge hole 9a and is connected at other end thereof to the drain tank 16. On the water-discharge tube 11 the high-pressure coupler 12 is disposed near to the second sealing plug 9, the digital pressure meter 13 is disposed downstream of the high-pressure coupler 12, and the variable relief valve 15, with an analogue pressure meter 14, is disposed downstream of the digital pressure meter 13. The air relief valve 18 is disposed on the drain tube 17 branched from the water-discharge tube 11 at portion between the high-pressure coupler 12 and the digital pressure meter 13 and is connected to the drain tank 16.

The variable relief valve 15 automatically opens when liquid pressure within the worked body 1 exceeds a set pressure, and automatically closes when it becomes less than the set pressure. Because of such operation of the variable relief valve 15, liquid pressure within the worked body 1, after having reached to the set pressure in the press-forming process, is maintained at the set pressure. The value of the set pressure is selected within a range so that liquid pressure in the worked body 1 does not excessively deform the non-restrain surfaces 1b. The air relief valve 18 relieves air within the worked body 1 when the water is supplied into the worked body 1.

Next, the manufacturing method for manufacturing, by using the above manufacturing apparatus, the irregular-section tubular body from the worked body 1 having the concave portion 1a will be explained.

In the first, as shown in FIG. 1, the first seal plug 8 to which the water supply tube is connected, and the second seal plug 9 to which the water-discharge control device 10 is connected are connected to one open portion and the other open portion of the worked body 1. The worked body 1 is set on the floating mold 5 and held at the ascended position by the pneumatic cylinder via the cushion pins 4. Simultaneously, the upper press mold 6 is descended by the hydraulic cylinder to be set above the worked body 1. In this condition, the concave mold surface 6a of the upper press mold 6 and the lower press mold 3 do not abut to the worked body 1.

With the air relief valve 18 being released, air within the worked body 1 is relieved and water W is supplied into the worked body 1 to fill it by operating the water supply pump. Then, the air relief valve 18 is closed.

The upper press mold 6 is descended by the hydraulic cylinder to abut at the concave mold surface 6a thereof to the worked body 1, so that the worked body 1 descends together with the floating mold 5. As a result, the worked body 1 abuts to the lower press mold 3 to be concaved at the concave portion 1a in the axis perpendicular direction by the convex mold portion 3a. Thus, formation of the concave portion 1a starts. Decrease of the internal volume of the worked body 1 occurs due to deformation thereof increases liquid pressure within the worked body 1.

When liquid pressure within the worked body 1 exceeds the set pressure preset, the variable relief valve 15 automatically opens. Water W within the worked body 1 is discharged with decrease of the internal volume thereof by amount corresponding to opened degree of the variable relief valve 15. In this way, the liquid pressure after having reached the preset pressure is maintained at the preset pressure.

Figure 2:
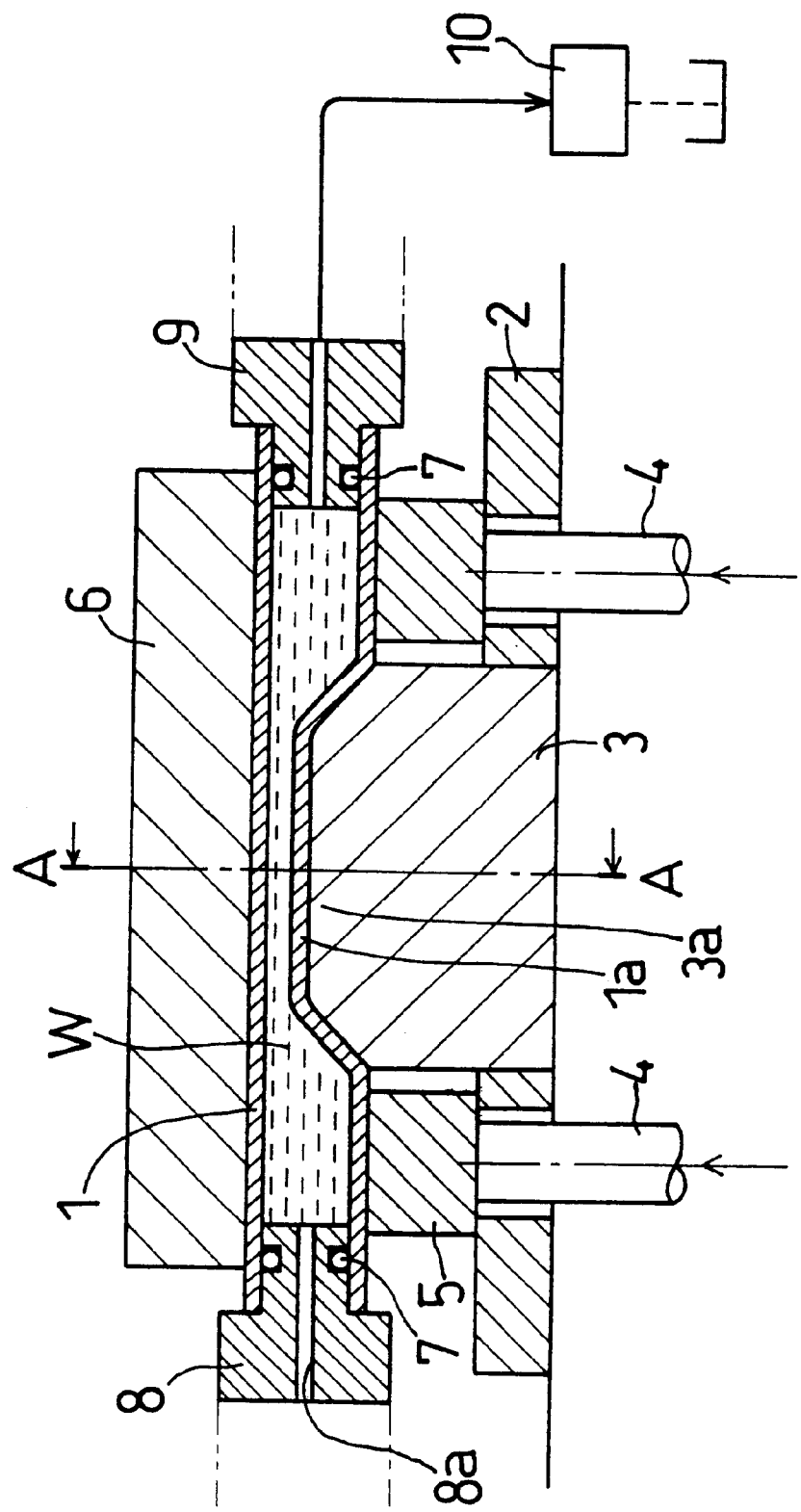
FIG. 2 is a section view showing a state post the press-forming according the manufacturing method of the embodiment 1.
Figure 3:
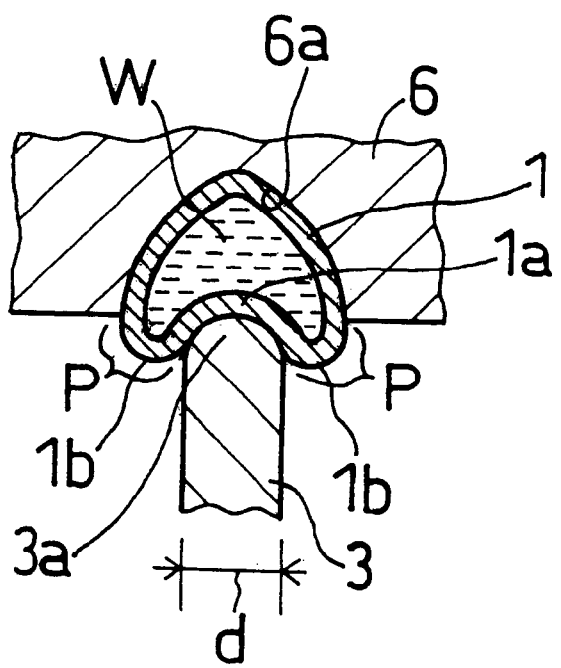
FIG. 3 is a section view along a line A—A in FIG. 2.

Under the condition that the liquid pressure within the worked body 1 being maintained in the preset pressure, the press-forming for forming the concave portion 1a by descending of the press upper mold 6 continues. It is completed at the time when the floating mold 5 abuts to the mold support 2 (FIG. 2).

When press-forming is completed, after discharging the water W within the work body 1, the upper press mold 6 is ascended by the hydraulic cylinder to de-mold the irregular-section tubular body having been pressed formed. In this way, the irregular-section tubular body having the concave portion 1a concaved in the axis perpendicular direction at axially intermediate portion has been manufactured.

As mentioned above, according to the manufacturing method of this embodiment, the final irregular-section tubular body can be obtained by only press-forming the worked body 1 sealingly filled with liquid therein, without any liquid pressure process after the press-forming process. As a result, the manufacturing process becomes simplified. In addition, the liquid pressurize device and the large-size extra hydraulic cylinder become unnecessary, which can not only avoid complex and large-sized equipment but avoid an increase of equipment cost.

In the pressure increase process in the former half of the press stroke, the worked body 1 is press-formed with the liquid pressure being applied to the inner peripheral surface thereof, which increases as a decrease of the internal volume of the worked body 1. As a result, the worked body 1 is deformed following the convex mold portion 3a of the lower press mold 3 and the concave mold surface 6a of the upper press mold 6, without generating any bend or buckle. Thus, the worked body 1 can be smoothly worked.

In the non-pressure increase process in the latter half of th press stroke, liquid pressure in the worked body 1, being prevented from an excessive increase, is maintained at a constant pressure. For this reason, although the lower press mold 3 (partial mold) and the upper press mold 6 do not restrain the circumferential part of the worked body 1 at portion P where the concave portion 1a is formed in the press-forming, the non-restrain surfaces 1b of the worked body 1 is prevented from excessive deformation and are suitably deformed. The lower press mold 3 i.e. the partial mold having the convex mold portion 3a, contributes to reduce manufacturing cost for the mold and wear of the mold, compared in case where both of the upper mold and the lower mold have closed construction.

In addition, the liquid-discharge control device 10 having the variable relief valve 15 discharges liquid in the worked body 1 at the predetermined timing of the press stroke, to thereby securely maintain liquid pressure in the worked body 1 at the constant pressure. Thus, liquid pressure applied to the inner surface of the worked body 1 is accurately controlled. As a result, increase of the liquid pressure at the predetermined timing is securely removed, so that the liquid pressure after the predetermined timing can be easily and securely maintained in the constant pressure.

Figure 6:
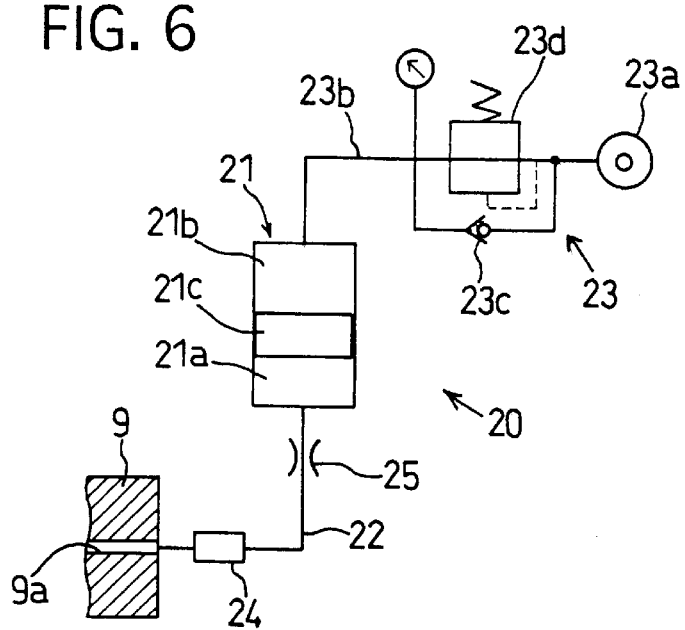
FIG. 6 is a block view showing a circuit construction of a discharge control device used in the manufacturing method for irregular section tubular body of the embodiment 2.

A second embodiment of the present invention is shown in FIG. 6. A manufacturing apparatus of the second embodiment uses a liquid-discharge controlling device (accumulator) 20 instead of the liquid-discharge control device 10 in the first embodiment, having different construction therefrom. Construction of the second embodiment other than the liquid-discharge control device 20 is same as that of the first embodiment.

The liquid pressure control device 20 is comprised of a cylinder member 21, a connect tube 22 and a gas supply means 23. The cylinder member 21 has a closed operate chamber of a predetermined capacity in which a partition member 21c is disposed reciprocately. The partition member 21c liquid-sealingly partitions the closed chamber into a liquid chamber 21a and a gas chamber 21b. The connect tube 22 is connected at one end thereof to a water-discharge hole 9a of a second seal plug 9 and is connected at other end thereof to the liquid chamber 21a of the cylinder member 21, to connect the internal space of the worked body 1 and the liquid chamber 21a of the cylinder member 21. The gas supply means 23 is connected to the gas chamber 21b of the cylinder member 21 to supply gas of a predetermined pressure thereto.

On the connect tube 22, a high-pressure coupler 24 is disposed near the second seal plug 9, and a restrict portion 25 is disposed downstream thereof. Liquid of high-pressure is discharged from the internal space of the worked body 1 and is introduced into the liquid chamber 21a after having been decreased in pressure at the restrict portion 25. As a result, gas pressure of the gas chamber 21b balancing with liquid pressure in the liquid chamber 21a can be decreased. Thus, an air compressor as an air supply source (to be explained later) supplying gas pressure to the gas chamber 21b can be compacted.

The gas supply means 23 includes the air compressor 23a, an air supply tube 23b, and an air regulator 23d provided with a check valve 23c disposed on the air supply tube 23b. The air supply tube 23b is connected at one end thereof to the gas chamber 21b and is connected to at other end thereof to the air compressor 23a.

Next, the manufacturing method for manufacturing, by the above manufacturing apparatus with the liquid-discharge control device 20, the irregular-section tubular body from the worked body 1 having the concave portion 1a will be explained.

The worked body 1 is disposed in the same manner as in the first embodiment. Then, water W is supplied by a water supply pump (not shown) to fill an internal space of the worked body 1, and gas of predetermined pressure is supplied into the gas chamber 21b of the cylinder member 21 by the air compressor 23a. Here, the pressure of gas supplied to the gas chamber 21b is preset in the predetermined value, corresponding to the max. pressure (set pressure) of the liquid pressure in the worked body 1 and the amount restricted at the restrict portion 25.

In this way, in the second embodiment, the press-forming process is the same as that of the first embodiment and is performed with the worked body being filled with the water W and the gas chamber 21b of the cylinder body 21 being filled with the gas. As long as the pressure of the liquid supplied from the worked body 1 to the liquid chamber 21a via the restrict portion 25 is lower than gas pressure in the gas chamber 21b, the partition member 21c stays the same without being lifted at the lowermost position to make volume of the gas chamber 21b maximum. For this reason, as the volume of the worked body 1 decreases corresponding to deformation thereof, the liquid pressure in the worked body 1 gradually increases. At the time when the pressure of the liquid supplied from the worked body 1 to the liquid chamber 21a becomes higher than the preset gas pressure in the gas chamber 21b, the partition member 21c is lifted up. Volume of the liquid chamber 21a increases and the water W in the worked body 1 is discharged therefrom by the predetermined amount, as the internal volume of the worked body 1 decreases. Thus, after having reached the set value, the liquid pressure in the worked body 1 is maintained at the predetermined value.

With liquid pressure in the worked body 1 being maintained, the worked body 1 is press-formed at the concave portion 1a by the descending upper press mold 6. The press-forming is completed at the time when the floating mold 5 abuts to the mold support 2.

The manufacturing method of the second embodiment can render the same advantages as that of the first embodiment.

Figure 7:
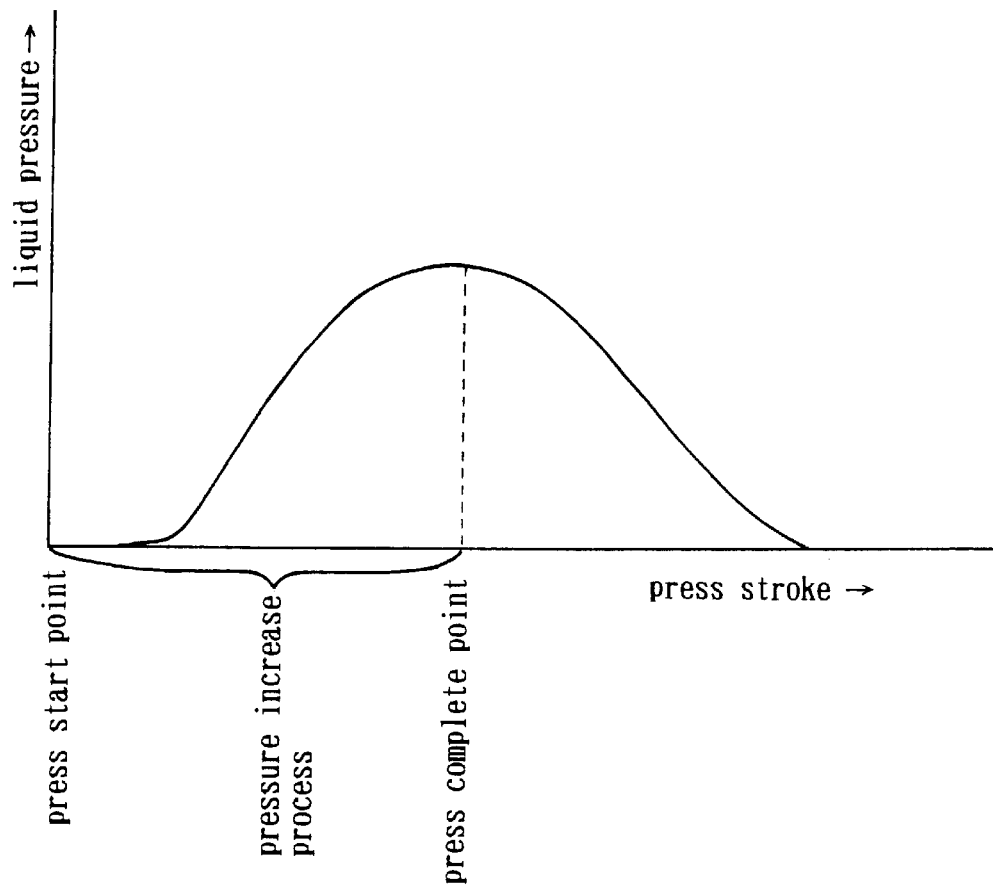
FIG. 7 is a diagram showing relation between a press stroke and a liquid pressure in a worked body in the manufacturing method for irregular section tubular body of an embodiment 3.

A third embodiment of the present invention is shown in FIG. 7. A manufacturing apparatus of this embodiment uses, instead of the liquid-discharge controlling device 10, a liquid-discharge controlling device in which hole diameter of the water-discharge hole 9a of the second seal plug 9 is selected in predetermined value (3 mm) and a discharge tube is connected to the discharge hole 9a. The remaining construction of manufacturing apparatus of the third embodiment is same as that of the first embodiment.

The hole diameter, i.e. the section-area of a flow passage of the water-discharge hole 9a, is so selected that liquid pressure in the worked body 1 reaches to the max. point at a press complete point where the floating mold 5 abuts to the mold support 2 and the upper press mold 6 decreases to the lowermost position. Here, the water-discharge hole 9a operates as the restrict portion. The max. pressure of the liquid at the press complete point is set within a range capable of preventing excessive deformation of the non-restrain surfaces 1b of the worked body 1.

When the irregular-section tubular body is manufactured by the manufacturing apparatus having the discharge control device, the worked body 1 is press-formed with the water W being filled therein. With a restricted amount of water-discharged from the worked body 1 through the discharge hole 9a at the restrict portion, as volume of the worked body 1 decrease due to deformation thereof, the liquid pressure in the internal space gradually increases. The rise in the speed of the liquid pressure is moderate compared to that of the first and second embodiments, since the predetermined amount of the water W is discharged through the water-discharge hole 9a.

Liquid pressure in the internal space of the worked body 1 reaches to the max. value when the floating mold 5 abuts to the mold support 2 and the upper press mold 6 descends to the lowermost position, i.e. in the press complete position. Then, it gradually decreases as the water W is gradually discharged from the worked body 1.

Thus, in the manufacturing method of the third embodiment, the worked body 1 filled with liquid is sufficiently press-formed to be formed into the final irregular-section tubular body, without requiring the liquid pressure process after the press-forming process. Thus, the manufacturing process becomes simplified. In addition, the liquid pressurizing device or the large-size extra hydraulic pressing device is not required, and the discharge control device is simplified. As a result, complex and large-sized equipment and a rise of equipment cost are reduced.

Also, as shown in FIG. 7, in the manufacturing method of the third embodiment, one stroke of the press-forming from the press start point to the press complete point is comprised of only a pressure increase process. The pressure increase stroke press-forms the worked body 1 by applying gradually increasing liquid pressure to the inner periphery surface thereof as the internal volume of the worked body 1 decreases. As a result, not only the worked body 1 can be deformed following to the convex mold portion 3a of the lower press mold 3 and the concave mold surface 6a of the upper press mold 6, but the worked body 1 is also prevented from the buckling. Thus, the worked body 1 is press-formed smoothly.

Further, the hole diameter of the discharge hole 9a, as the restrict portion, is selected in the predetermined value in connection with the max. liquid pressure. For this reason, the non-restrain portions 1b, prevented from excessive deformation by liquid pressure, are formed into the desired shape. The lower press mold 3 having the convex mold portion 3a is constructed as a partial mold and can reduce the cost of the mold and the wear of the mold, compared to the closed type upper and lower molds.

In the third embodiment, since the liquid pressure in the worked body 1 is set to become the max. value at the press complete point, one stroke of the press-forming is comprised of only pressure increase process. However, it can be set to become the max. value midway through the press stroke as mentioned in the first and second embodiments. In this case, one stroke is comprised of the pressure increase process and the non-pressure increase process. This can be performed by reducing the descending speed of the upper press mold 6 below the predetermined value at the predetermined position.

Also, in the third embodiment, the discharge hole 9a is used as the restrict portion by controlling hole diameter thereof. However, a restrict portion having predetermined section-area of the flow passage can be provided midway on the water-discharge tube, instead of the discharge hole 9a.

All of the irregular section tube bodies of the embodiments one to three are excellent as the press-formed articles. As a result, a pressure rise speed in the pressure increase process, maintained time period of the max. value and pressurized state after the max. pressure state, do not badly affect the quality of the press-formed article.

Figure 8:
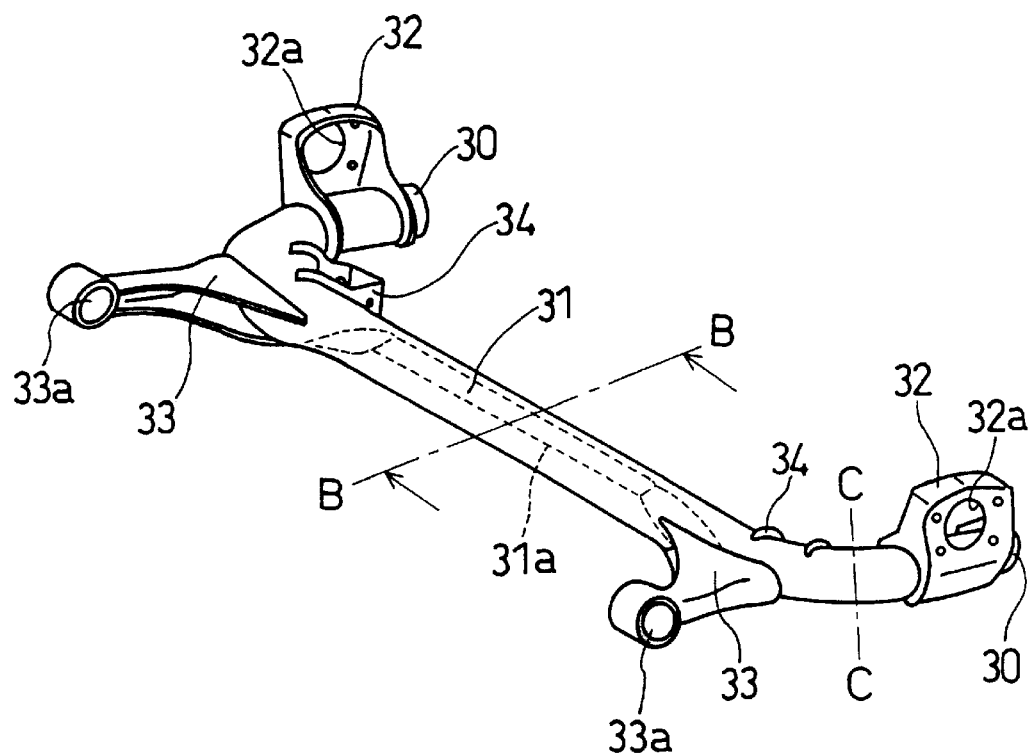
FIG. 8 is a perspective view showing a whole construction of a torsion beam of an embodiment 4.
Figure 9:
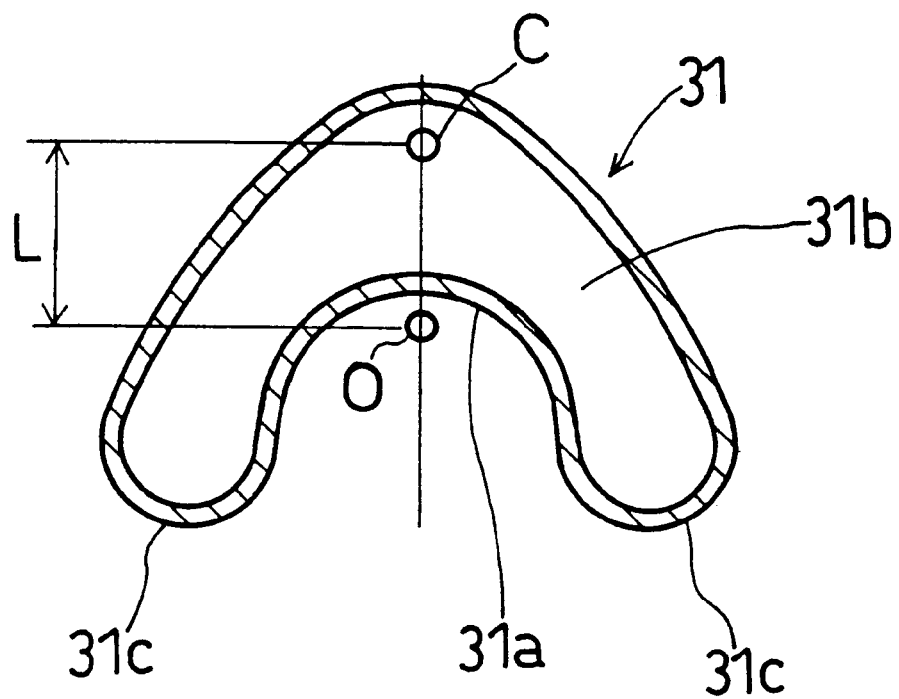
FIG. 9 is a section view along a line B—B in FIG. 8, showing an axial perpendicular section shape at a concave portion of an axle beam of the embodiment 4.
Figure 10:
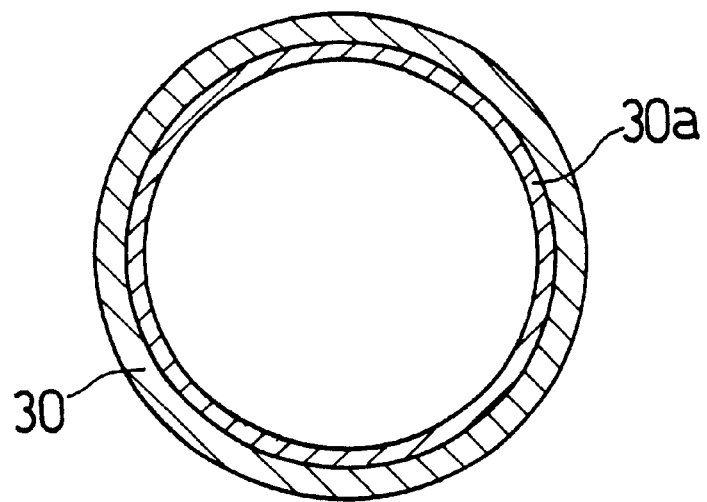
FIG. 10 is a section view along a line C—C in FIG. 8, showing an axial perpendicular section shape of a trailing arm of a torsion beam of the embodiment 4.

FIGS. 8 to 10 show an axle beam 31 for torsion beam of a fourth embodiment according to the present invention. The axle beam 31 is joined to each of one ends of a pair of trailing arms 30 attached to wheels to connect them.

The torsion beam is used in a suspension device of a rear wheel vehicle, and is comprised of the paired trailing arms 30, the axle beam 31, a pair of axle carriers 32, a pair of arms 33, and a pair of brackets 34. The paired axle carriers 32 are joined to the trailing arms 30 by welding, and the paired arms 33 are joined by welding to extend horizontally from both ends of the axle beam 31 toward front side when the torsion beam is mounted on the vehicle. The paired brackets 34 are joined to both ends of the axle beam 31 by welding to be disposed at rear side thereof when the torsion beam is mounted on the vehicle.

Each of the trailing beams 30, as shown in FIG. 10, has a cross-section of a true circle shape. An inner pipe 30a is inserted into and joined to the trailing arm 30 to increase rigidity of the trailing arm 30 against an input force applied thereto from the wheel upon turning of the vehicle. Both trailing arms 30 are bent orthogonal to both of the axial direction of the axle beam 31 and the concave direction of the concave portion 31a.

The axle beam 31, as shown in FIG. 9, has a concave portion 31a concaved in an axis perpendicular direction thereof, and extending over substantially the whole axial length thereof. The concave portion 31a has a cross-section of closed U-shape defining a single sealingly closed space 31b therein. In the cross section, a shearing center C is offset from a centroid O by predetermined distance L to be positioned just above the centroid O, when the torsion beam is mounted on the vehicle. A pair of extend portions 31c divergently extend at both sides of the concave portion 31a. Thus, an outer periphery wall of the whole concave portion 31a is comprised of only curved portions.

Each of the paired axle carriers 32 rotatably supporting a wheel has an insert hole 32a into which a wheel shaft is inserted. Each of the paired arms 33 has a connect hole 33a at which it is connected to the vehicle body rockably in upper and lower directions.

The torsion beam of the fourth embodiment having the above construction can be manufactured in following manner.

The cylindrical worked body, made of metal blank tube of which cross-section is true circle, is subjected to the press forming, in the same manner as that of the first embodiment. The concave portion 31a concaved in the axis perpendicular direction is press-formed at the axially intermediate portion. Then, both ends of the worked body 1 are bent to form the axle beam 31 and the paired trailing arms 30 integrally. Then, the inner pipes 30, coated with an adhering agent on an outer peripheral surface thereof, are inserted into and joined to the trailing arms 30, respectively. Next, the paired axle carriers 32, the arms 33 and the brackets 34 respectively formed into predetermined shape are joined to predetermined positions of the integrated axle beam 31 and trailing arms 30.

The axle beam 31 of the fourth embodiment has the concave portion 31a having a cross-section shape in which the shearing center C is offset upwardly from the centroid O by predetermined amount L. As a result, not only the roll rigidity increases, but the steering stability increases due to a decrease in the under-steer tendency of the steering character.

Due to the cross-section shape of the concave portion 31a above-mentioned, the torsion rigidity and roll rigidity of the axle beam 31 can be adjusted by changing size or dimension of the closed space 31b. For this reason, no additional stabilizer for the roll control is required. Also, the axle beam 31, having the closed cross-section shape including the closed space 31b, does not have any shear edge portion where fatigue cracks may occur, so that endurance character has increased.

The offset amount of the shearing center C from the centroid O is selected so that the steer-stabilizing character resulting from offset increases sufficiently and the straightly advancing character or vehicle tracking is not influenced badly. Since the shearing center C is offset from the centroid O to be located just above it when the torsion beam is mounted on the vehicle, the steering-stabilize character resulting from offset is effectively performed. Further, the concave portion 31a has cross-section shape of a substantially U-shape, therefore size of the closed space 31b and offset amount of the sheering center C from the centroid O can be easily changed. Accordingly, the torsion rigidity, rolling rigidity and steering character of the axle beam 31 can be easily adjusted. Also, the shearing center C can be offset from the centroid O more effectively even in limited space.

Figure 11:
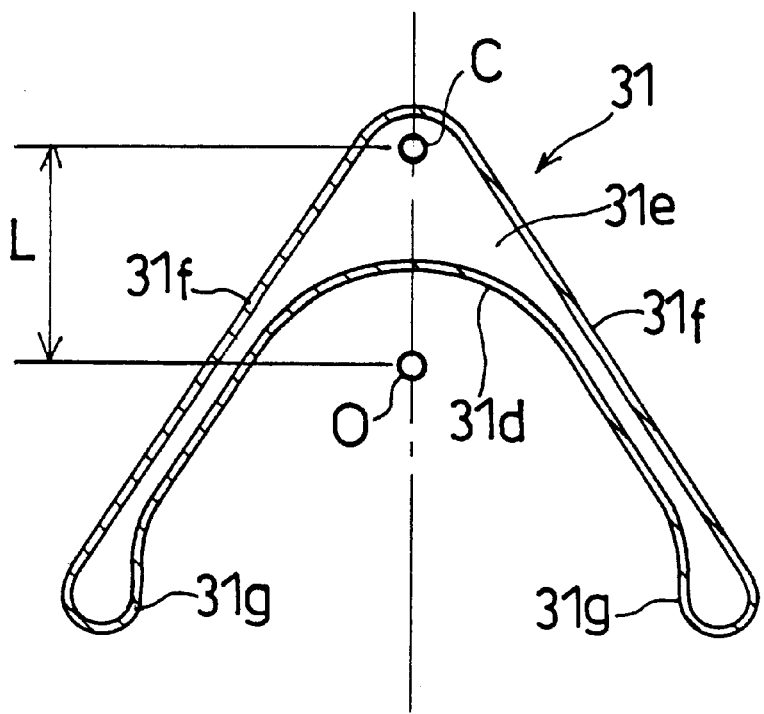
FIG. 11 is a section view along a line B—B in FIG. 8, showing an axial perpendicular section shape at a concave portion of an axle beam of an embodiment 5.

A Torsion beam of a fifth embodiment is disclosed in FIG. 11 and differs from that of the fourth embodiment only in a cross-section shape of a concave portion 31d of the axle beam 31. The remaining construction is same as that of the fourth embodiment.

A concave portion 31d of the axle beam 31 forms one closed space 31e and has a closed cross-section of a substantially V-shape in which the shearing center C is offset from the centroid O by a predetermined amount L. An outer periphery wall of the concave portion 31d is comprised of a pair of straight hypotenuse portions 31f, and a pair of expand portions 31g expanded inwardly at tip ends of the hypotenuse portions 31f. The closed space 31e has a larger size at a center top portion thereof than at a remaining portion. The shearing center C is offset from the centroid O to be located just above it when the torsion beam is mounted on the vehicle.

The axle beam 31 of the fifth embodiment operates in the same manner as that of the fourth embodiment, and can render the same advantages as that of the fourth embodiment. In addition, local large-size of the closed space 31e at the expand portions 31g (the tip ends) and at bottom portion of V-shape can increase the torsion rigidity at these portions locally.

Figure 12:
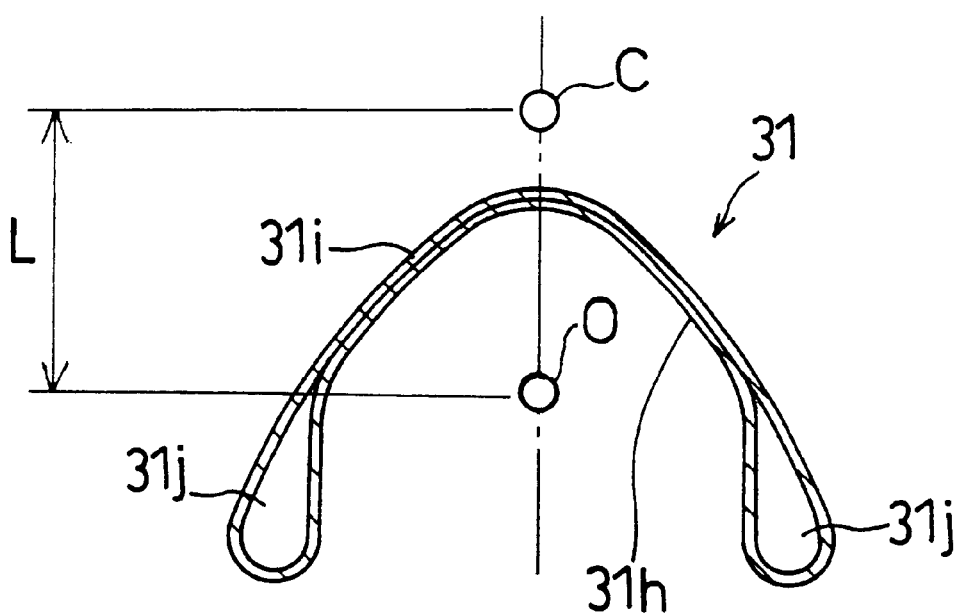
FIG. 12 is a section view along a line B—B in FIG. 8, showing an axial perpendicular section shape of a trailing arm of a torsion beam of an embodiment 6.

A Torsion beam of a sixth embodiment is disclosed in FIG. 12 and differs from that of the fourth embodiment only in a cross-section shape of a concave portion 31h of the axle beam 31. The remaining construction is same as that of the fourth embodiment.

A concave portion 31h of the axle beam 31 forms two closed spaces 31j separated by an overlapped portion 31i where outer peripheral walls are overlapped. It has a closed cross-section of a substantially V-shape in which shearing center C is offset from the centroid O by a predetermined amount L. The outer periphery wall of the concave portion 31h is comprised of a pair of curved hypotenuse portions 31k. The shearing center C is offset from the centroid O to be located just above it when the torsion beam is mounted on the vehicle.

The axle beam 31 of the embodiment 6 operates in the same manner as that of the embodiment 4, and can render the same advantages as that of the embodiment 4.

A torsion beam of a seventh embodiment is manufactured from an irregular and offset rough tube, and a cross section shape of an axle beam 31 at a concave portion 31a is changed into a shape the same as that of the fifth embodiment. The remaining construction of the torsion beam is same as that of the fourth embodiment.

Figure 13:
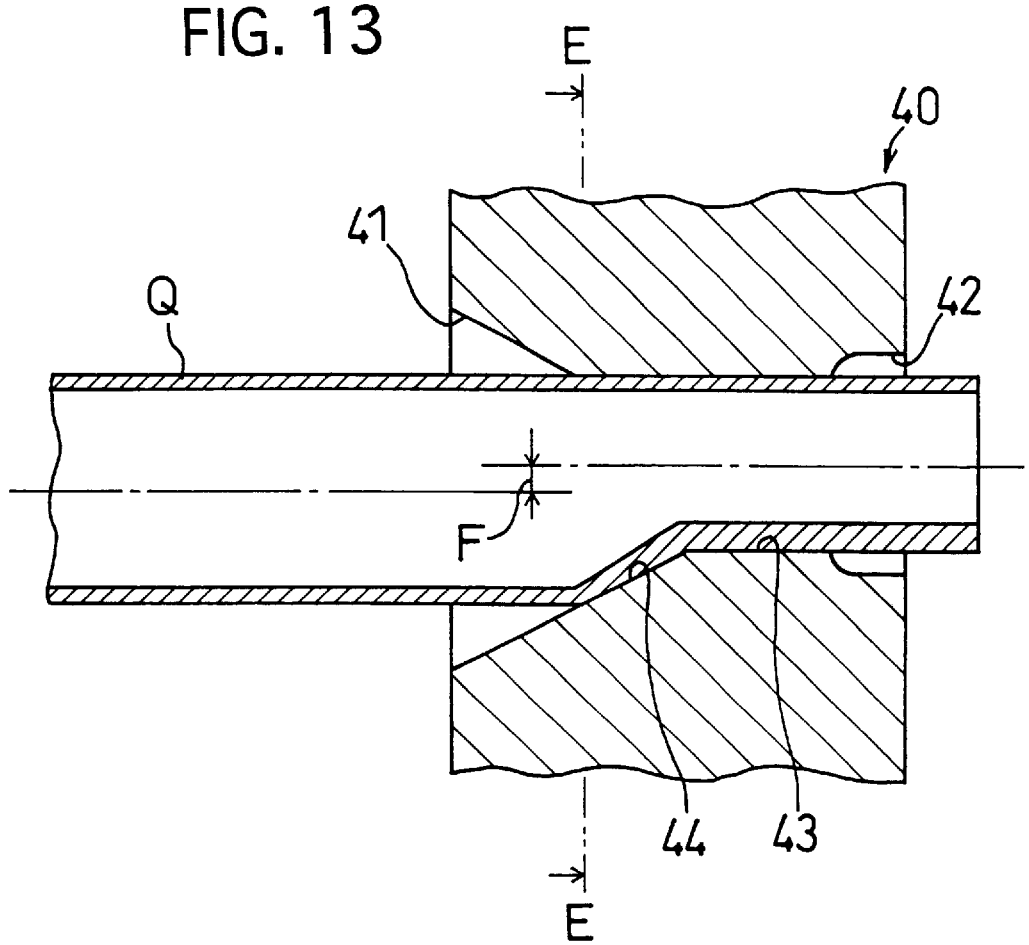
FIG. 13 is a section view of an embodiment 7 showing a state where one end of a blank tube is diameter-reduced with being offset.
Figure 14:
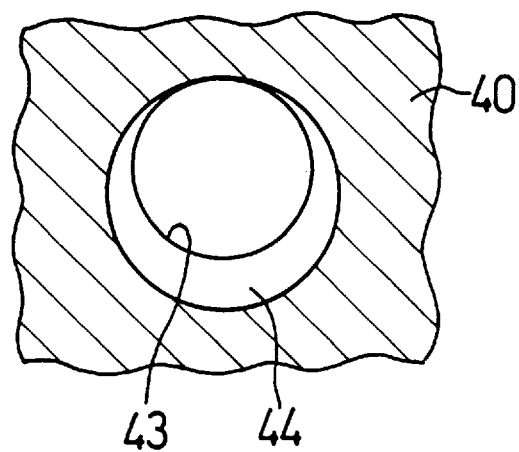
FIG. 14 is a section view along a line E—E in FIG. 13, showing a forming mold.

A metal blank tube Q having a cross-section of true circle shape and even thickness is prepared similar to the fourth embodiment. Also, as shown in FIGS. 13 and 14, a forming mold 40 including a first opening 41, a second opening 42, an axial hole 43, and a sloped guide surface 44 is prepared. The first opening 41 is opened on one end surface of the forming mold 40 and has true circle shape. The second opening 42 of true circle shape and opened on other surface has smaller diameter than that of the first opening 41, and is offset from the first opening 41 by a predetermined amount F. The axial hole 43 is formed succeeding the second opening 42 coaxially therewith and has an inner diameter equivalent to outer diameter of a small-diameter end portion (to be explained later). The sloped guide surface 44 of circular shape is formed succeeding the axial hole 43 at side of the first opening 41 so that an opened periphery is coaxial with the first opening 41.

As shown in FIGS. 13 and 14, the sloped guide surface 44 of which a part of the cross-section (upper part in the axis perpendicular direction in FIGS. 13 and 14) coincides with a corresponding part of the axial hole 43 gradually enlarges an inner diameter thereof toward the first opening 41. Also, the blank tube Q disposed coaxially with the first opening 41 and the sloped guide surface 44 coincides at one part of the axis hole 43 (upper part in the axis perpendicular direction in FIGS. 13 and 14) with an inner peripheral surface of the axis hole 43 and an outer peripheral edge of the sloped guide surface 44.

The blank tube Q is pressed into the axial hole 43 from the first opening 41 so that an axial one end (right end in FIG. 13) thereof is worked (reduced outer diameter thereof) by the sloped guide surface 44 and inner surface of the axial hole 43. In the diameter-reducing work, the blank tube Q is reduced in outer diameter thereof from the one part where the outer diameter is not reduced to other part (lower part in the axis perpendicular direction in FIG. 13) so that the outer diameter reduced rate increases gradually. As a result, the other part is diameter-reduced to the maximum. The other axial end (left end in FIG. 13) is subjected to the diameter-reducing work similarly.

Figure 15:
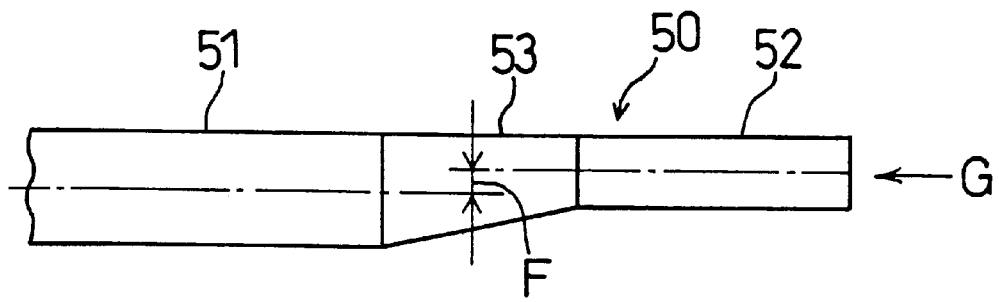
FIG. 15 is a front view of the embodiment 7 showing an offset and different diameter rough tube having a large-diameter intermediate portion, small-diameter end portions and outer diameter gradually change portion is diameter-reduced.

As a result, as shown in FIG. 15, the rough tube 50 comprised of a large-diameter intermediate portion 51 located at an axially intermediate portion, a pair of small-diameter end portions 52 having smaller outer diameter than that of the inter mediate portion 51, and a pair of diameter change portions 53 each connecting each end of the intermediate portion 51 and the end portion 52, has been manufactured. Both small-diameter end portions 52 are offset form the large-diameter intermediate portion 51 by a predetermined amount F toward one part (upper part in the axis perpendicular direction in FIG. 15). At a peripheral part located at the offset side, the large-diameter intermediate portion 51, outer diameter change portion 53 and the small-diameter end portions 52 are connected by a continuous surface without radial step to be flush with each other.

Figure 16:
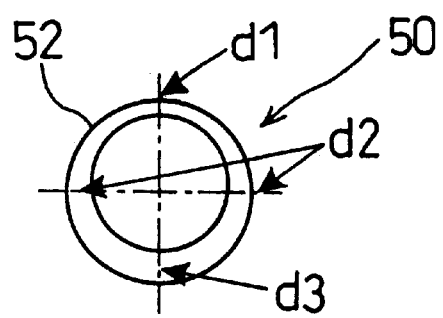
FIG. 16 is a side view viewed from direction G in FIG. 15, showing the small-diameter end portions.

As shown in FIG. 16, the small-diameter end portion 52 has the smallest thickness d1 at one part (upper part in the axis perpendicular direction in FIG. 16), the largest thickness d3 at other part (lower part in FIG. 16). Thickness gradually increases from the smallest thickness d1 to the largest thickness d3 via an intermediate thickness d2 (d1<d2<d3). The smallest diameter d1 is equal to thickness of the large-diameter intermediate portion 51 not having been subjected to the diameter reducing work which is in turn equal to thickness of the blank tube Q.

On the large-diameter intermediate portion 51a concave portion 51a concaved in the axis perpendicular direction is press-formed similar to the embodiment 4 in the same manner as that of the first embodiment.

Figure 17:
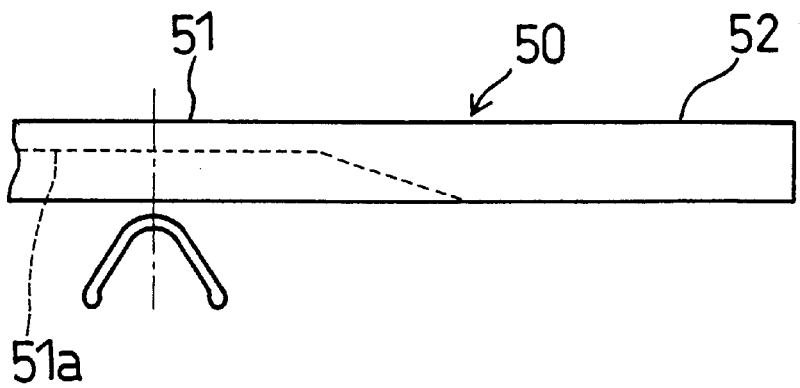
FIG. 17 is front view of the embodiment 7 showing a state where the concave portion is formed on the large-diameter intermediate portion.
Figure 20:
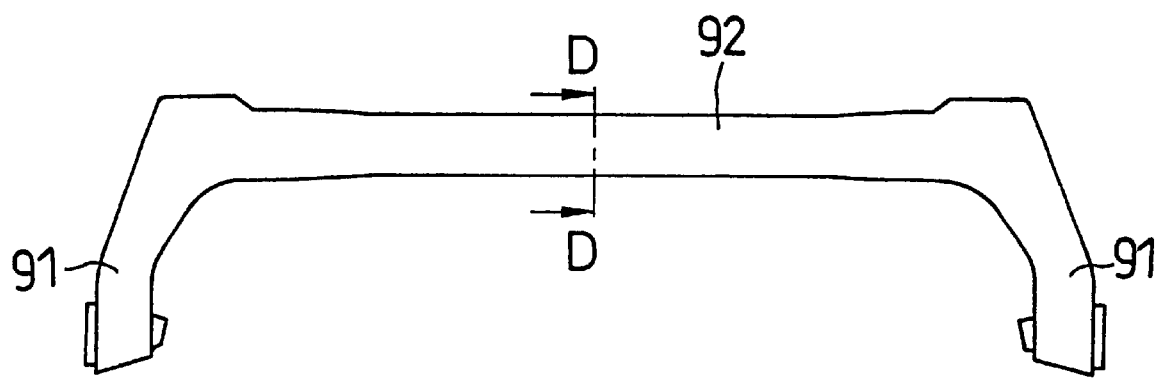
FIG. 20 is a perspective view showing a whole construction of a conventional torsion beam.
Figure 21:
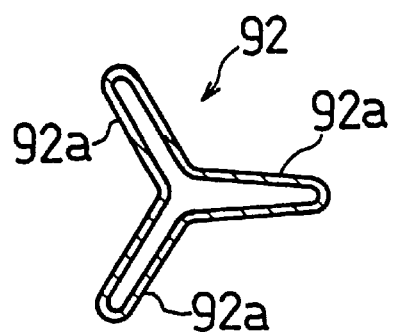
FIG. 21 shows an axis perpendicular section shape of the axle beam in the conventional torsion beam, corresponding to a section view along a line D—D in FIG. 20.

In a cross-section shape of the concave portion 51a, a shearing center C is offset from the centroid O in the same direction where the small-diameter portions 52 are offset from the large-diameter intermediate portion 51. As is apparent from FIG. 17 showing the condition of the concave portion 51a having been formed, the large-diameter intermediate portion 51 and the small-diameter end portions 52 are connected by a continuous surface without any steps, at one part (upper part in the axis perpendicular direction in FIG. 17) and other part (lower part in FIG. 17)

Then, similar to the fourth embodiment, the axle beam and the paired trailing arms are formed integrally by bending work, and the inner pipe, axle carrier, arm and bracket are joined, whereby the torsion beam is completed.

In the torsion beam, the large-diameter intermediate portion 51 and the sloped diameter change portion 53 of the rough tube 50 form the axle beam, while each small-diameter portion 52 form each trailing arm, respectively. The axle beam can also be formed by the large-diameter intermediate portion 51 and one part of the sloped diameter change portion 53, while each of the trailing arms can be formed by the other part of the sloped diameter change portion 53 and each of the small-diameter portions 52, respectively. Also, the axle beam can be formed by only the large-diameter intermediate portion 51, while each of the trailing arms can be formed by each of the sloped diameter change portions 53 and each of the small-diameter portion 52, respectively.

The torsion beam of the seventh embodiment can render, in addition to the operation and advantage of the fourth embodiment, additional operations and advantages. That is, the axle beam portion does not have any radial step at one part and other part thereof in the axis perpendicular direction, so that the rigidity against axial input, i.e. input in lateral direction of the vehicle, increases. Also, not only does each of the trailing arm portions have varied thickness d1, d2, and d3 in the circumferential direction, but the diameter-reduced rate, i.e. work hardened degree, increases from the portion of smallest diameter d1 to the portion of largest diameter d3. As a result, in the trailing arm portions, the rigidity and strength increases from the portion of smallest diameter d1 to the portion of largest diameter d3.

As mentioned above, according to the manufacturing method for an irregular-section tubular body of the present invention, the manufacturing process can be simplified, the liquid pressurize device and large-size hydraulic press device become unnecessary, and complex and large-sized equipment and increase of the equipment cost can be avoided.

What is claimed is:

1. An axle beam for a torsion beam, comprising:

a pair of trailing arms attached to a wheel side of the axle beam; and a concave portion concaved in an axis perpendicular direction, wherein an axis perpendicular section has a closed section shape forming a closed and sealed space and a shearing center offset from a centroid by a predetermined amount.

2. The axle beam for a torsion beam according to claim 1, further comprising:

a circumferential part disposed opposite to the concave portion in the axis perpendicular direction, wherein the circumferential part has one of a substantially U-shaped and a substantially V-shaped axis perpendicular section at the concave portion.

3. The axle beam for a torsion beam according to claim 1, further comprising:

a large-diameter axially intermediate portion;

a pair of small-diameter axially end portions comprising the trailing arms, wherein the small-diameter end portions have a diameter smaller than the large-diameter axially intermediate portion;

a pair of diameter change portions connecting each end of the large-diameter axially intermediate portion and each of the small-diameter axially end portions, wherein the concave portion is formed on the large-diameter axially intermediate portion, and wherein the large-diameter axially intermediate portion, the diameter change portions and the small-diameter axially end portions are connected by a continuous surface having no radial step, due to an offset of the small-diameter axially end portions from the large-diameter axially intermediate portion in the same direction that the shearing center is offset from the centroid, at a circumferential part of the small-diameter axially end portions at the offset side.

4. The axle beam for a torsion beam according to claim 2, further comprising:

small-diameter axially end portions bent in a direction orthogonal to the axial direction of the axle beam and orthogonal to a concave direction of the concave portion.

5. The axle beam for a torsion beam according to claim 3, wherein each of the small-diameter axially end portions are bent in a direction orthogonal to the axial direction of the axle beam and orthogonal to a concave direction of the concave portion.

* * * * *